United States Patent
Herdman et al.

(10) Patent No.: US 9,809,899 B2
(45) Date of Patent: Nov. 7, 2017

(54) TREATMENT FOR ELECTROPLATING RACKS TO AVOID RACK METALLIZATION

(71) Applicant: MacDermid Acumen, Inc., Waterbury, CT (US)

(72) Inventors: Roderick D. Herdman, Staffordshire (GB); Trevor Pearson, West Midlands (GB); Roshan V. Chapaneri, West Midlands (GB); Alison Hyslop, Birmingham (GB)

(*) Notice: Subject to any disclaimer, the term of this patent is extended or adjusted under 35 U.S.C. 154(b) by 472 days.

(21) Appl. No.: 14/454,131

(22) Filed: Aug. 7, 2014

(65) Prior Publication Data
US 2016/0040315 A1    Feb. 11, 2016

(51) Int. Cl.
| | |
|---|---|
| *C25D 5/54* | (2006.01) |
| *C25D 5/56* | (2006.01) |
| *C25D 17/08* | (2006.01) |
| *C09D 181/00* | (2006.01) |
| *C25D 5/34* | (2006.01) |
| *C23C 18/16* | (2006.01) |
| *C23C 18/20* | (2006.01) |
| *C23C 18/22* | (2006.01) |
| *C23C 18/30* | (2006.01) |

(52) U.S. Cl.
CPC .......... *C25D 17/08* (2013.01); *C09D 181/00* (2013.01); *C23C 18/1653* (2013.01); *C23C 18/2086* (2013.01); *C23C 18/22* (2013.01); *C23C 18/30* (2013.01); *C25D 5/34* (2013.01)

(58) Field of Classification Search
CPC ........................................ C23C 28/02
USPC ..................... 205/159, 167, 169
See application file for complete search history.

(56) References Cited

U.S. PATENT DOCUMENTS

| | | | |
|---|---|---|---|
| 3,357,913 A | 12/1967 | Zavarella | |
| 3,518,171 A | 6/1970 | Merker et al. | |
| 4,297,197 A | 10/1981 | Salman | |
| 4,523,983 A * | 6/1985 | Lin | C08F 261/12 522/102 |
| 4,743,640 A | 5/1988 | Wirth et al. | |
| 5,160,600 A | 11/1992 | Patel et al. | |
| 5,371,280 A | 12/1994 | Haramaki et al. | |
| 6,194,494 B1 | 2/2001 | Wehner et al. | |
| 2004/0129677 A1* | 7/2004 | Portner | C08J 7/14 216/83 |
| 2005/0183793 A1 | 8/2005 | Kim et al. | |
| 2005/0199587 A1 | 9/2005 | Bengston | |
| 2006/0094831 A1 | 5/2006 | Choi et al. | |
| 2009/0092757 A1 | 4/2009 | Satou et al. | |
| 2009/0253892 A1 | 10/2009 | Bischoff et al. | |
| 2010/0243463 A1 | 9/2010 | Herdman et al. | |
| 2013/0186774 A1 | 7/2013 | Pearson et al. | |
| 2013/0210979 A1 | 8/2013 | Kondo et al. | |

FOREIGN PATENT DOCUMENTS

| | | |
|---|---|---|
| GB | 1 339 265 | 11/1973 |
| JP | 58-104197 | 6/1983 |
| JP | 58104197 A * | 6/1983 |
| JP | 59187031 A * | 10/1984 |

* cited by examiner

*Primary Examiner* — Edna Wong
(74) *Attorney, Agent, or Firm* — Carmody Torrance Sandak & Hennessey LLP

(57) ABSTRACT

A method of coating an electroplating rack used for supporting non-conductive substrates during a plating process. The method comprises the steps of contacting at least a portion of the electroplating rack with a plastisol composition, the plastisol composition having dispersed therein an effective amount of an additive; and heating the electroplating rack with the plastisol composition thereon to a suitable temperature and for a sufficient time to cure the plastisol and form a solid insulating coating on the electroplating rack. The coated electroplating rack may then be used for mounting non-conductive substrates for subsequent metallization steps.

6 Claims, No Drawings

TREATMENT FOR ELECTROPLATING RACKS TO AVOID RACK METALLIZATION

FIELD OF THE INVENTION

The present invention relates generally to a method of treating electroplating racks used for supporting non-conductive substrates during a metallization step.

BACKGROUND OF THE INVENTION

For many years, processes have been available to facilitate the deposition of electrodeposited metals onto plastic substrates. Typically, the process involves the steps of:
1) Etching the plastic in a suitable etching solution such that the surface of the plastic becomes roughened and wetted so that the subsequently applied deposit has good adhesion;
2) Activating the surface of the plastic using a colloidal or ionic solution of a metal (usually palladium) capable of initiating the deposition of an autocatalytically applied metal coating (e.g., copper or nickel);
3) Depositing a thin layer of autocatalytically applied metal; and
4) Carrying out electrodeposition of metal on the metallized plastic substrate.

Typically, layers of copper, nickel and/or chromium will be applied to produce the finished article.

The most widely used plastic substrates are acrylonitrile/butadiene/styrene copolymers (ABS) or ABS blended with polycarbonate (ABS/PC). These materials are readily formed into components by the process of injection molding. ABS comprises a relatively hard matrix of acrylonitrile/styrene copolymer and the butadiene polymerizes to form a separate phase. It is this softer phase of polybutadiene (which contains double bonds in the polymer backbone) which may be readily etched using various techniques.

Traditionally, the etching has been carried out using a mixture of chromic and sulfuric acids operated at elevated temperature. The chromic acid is capable of dissolving the polybutadiene phase of the ABS by oxidation of the double bonds in the backbone of the polybutadiene polymer, which has proven to be reliable and effective over a wide range of ABS and ABS/PC plastics. However, the use of chromic acid has become increasingly regulated because of its toxicity and carcinogenic nature. For this reason, there has been considerable research into other means of etching ABS plastics and a number of approaches have been suggested to achieve this.

For example, acidic permanganate is capable of oxidizing the double bonds in the polybutadiene. Chain scission can then be achieved by further oxidation with periodate ions. Ozone is also capable of oxidizing polybutadiene. However, ozone is extremely dangerous to use and highly toxic. Likewise, sulfur trioxide can be used to etch ABS, but this has not been successfully achieved on a typical plating line. Other examples of techniques for etching ABS plastics are described in U.S. Pat. Pub. No. 2005/0199587 to Bengston, U.S. Pat. Pub. No. 2009/0092757 to Sakou et al., and U.S. Pat. No. 5,160,600 to Gordhanbai et al., the subject matter of each of which is herein incorporated by reference in its entirety.

More recently, it has been discovered that ABS and ABS/PC plastic can be etched in a solution containing manganese(III) ions in strong sulfuric acid as described in U.S. Pat. Pub. No. 2013/0186774 to Pearson et al., the subject matter of which is herein incorporated by reference in its entirety.

In order to plate plastic components, they are attached to plating racks which transmit the electrical current to the sensitized and metallized plastic components. After assembly of the plating racks but prior to use, it is desirable to cover at least a portion of the rack with an insulating coating of plastic or the like and a preferred and commonly used insulating coating is a plastisol such as a polyvinyl chloride resin dispersed in a plasticizer (i.e., a "PVC plastisol"). The use of a plastisol coating prevents the rack from being covered with metal during the electroplating process. The use of plastisols, such as PVC plastisols, for rack plating is well known as described for example in U.S. Pat. No. 3,357,913 to Zavarella and U.S. Pat. No. 4,297,197 to Salman, the subject matter of each of which is herein incorporated by reference in its entirety.

The use of chromic acid in the etching stage prior to activation is effective in modifying the surface of the plastisol coating so that it is resistant to metallization after being coated with a palladium activator (usually a colloid of palladium and tin). However, when chromic acid is replaced with other etching techniques, for example, using processes containing permanganate or manganese (III), the plastisol coating of the plating rack becomes coated with the activator and subsequently becomes coated with a layer of either nickel or copper in the electroless plating stage.

Thus, a major problem with all of the currently known methods that do not utilize chromic acid in the etching stage is that rack coatings tend to become plated in the subsequently electroless plating stage. This phenomenon is known as "rack plate up" and has been a major problem with any form of chrome-free etching technology.

There is a need in the art for a modified PVC plastisol coating that is capable of being used in a chrome-free etch process without subsequent metallization of the rack and that does not contain ingredients that leach out of the plastisol and cause deleterious effects in the treatment tanks.

SUMMARY OF THE INVENTION

It is an object of the present invention to inhibit rack plate up in the process of electroplating non-conductive substrates.

It is another object of the present invention to inhibit rack plate up in the process of electroplating non-conductive substrates in which non-conductive substrates are etched using a chrome-free etchant.

It is still another object of the present invention to provide a modified plastisol coating for electroplating racks used for supporting non-conductive substrates during the electroplating process.

It is still another object of the present invention to provide a modified plastisol coating in which the components of the coating do not leach out of the plastisol into the plating line.

To that end, in one embodiment, the present invention relates generally to a method of coating an electroplating rack used for supporting non-conductive substrates during a plating process, the method comprising the steps of:
 a) contacting at least a portion of the electroplating rack with a plastisol composition, the plastisol composition having dispersed therein an effective amount of an additive having the structure:

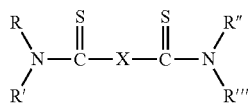

wherein R, R', R" and R'" are either the same or are independently selected from the group consisting of benzyl, substituted benzyl, phenyl or substituted phenyl, and $X=(S)_n$ where n=1 to 6; or

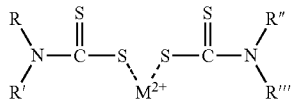

wherein R, R', R" and R'" are either the same or are independently selected from C1-C10 alkyl (either straight or branched chain), benzyl, substituted benzyl, phenyl, or substituted phenyl and M is a divalent metal cation, preferably selected from the group consisting of nickel, copper and zinc; and b) curing the plastisol to form a solid insulating coating on the electroplating rack.

In another embodiment, the present invention relates generally to a method of metallizing non-conductive substrates, the method comprising the steps of:

a) mounting parts to be metallized on one or more electroplating racks, wherein the electroplating racks are coated with a plastisol composition on at least a portion of the electroplating rack, the plastisol composition having dispersed therein an effective amount of an additive having the structure:

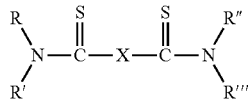

wherein R, R', R" and R'" are either the same or are independently selected from the group consisting of benzyl, substituted benzyl, phenyl or substituted phenyl and $X=(S)_n$ where n=1 to 6; or

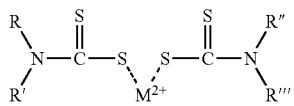

wherein R, R', R" and R'" are either the same or are independently selected from C1-C10 alkyl (either straight or branched chain), benzyl, substituted benzyl, phenyl, or substituted phenyl and M is a divalent metal cation, preferably selected from the group consisting of nickel, copper and zinc;

b) etching the non-conductive substrates mounted on the treated electroplating rack with an etchant that does not contain chromic acid;

c) activating the surface of the non-conductive substrates by immersing the electroplating rack with the non-conductive substrates mounted thereon into a solution comprising palladium;

d) immersing the electroplating rack containing the etched and activated non-conductive substrates mounted thereon in an electroless metallization bath to electrolessly deposit metal thereon; and e) electroplating the non-conductive substrates to plate metal thereon, wherein the plastisol composition on the electroplating rack remains free of the electrolessly deposited metal.

As used herein plastisol composition is meant to include any insulating plastic composition which can be coated on an electroplating rack and cured thereon.

DETAILED DESCRIPTION OF THE PREFERRED EMBODIMENTS

The present invention allows for the treatment of electroplating racks used for the purpose of supporting non-conductive substrates during a metallization step. The method described herein allows for the effective activation of plastics that have been etched without the use of chromic acid while avoiding the common problem of rack "plate up" which occurs in processes where chromic acid free etchants are used for the initial roughening of the plastic. In addition, the present invention relates generally to the catalysis and subsequent metallization of plastics such as ABS and ABS/PC plastics that have been etched in process solutions that do not contain chromic acid and without problems of "plate up" on at least partially coated racks.

The inventors of the present invention have discovered that two particular classes of organosulfur compounds are particularly effective in preventing plate-up of plastisol coated plating racks when incorporated into the plastisol coatings. These compounds are preferably incorporated into the plastisol coatings at a concentration in the range of between about 1 to about 20% by weight and more preferably between about 5 and about 15% by weight. The effective compounds include compounds selected from structures 1 and 2 below.

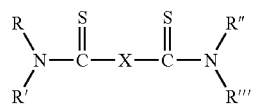

Wherein R, R', R" and R'" are either the same or are independently selected from the group consisting of benzyl, substituted benzyl, phenyl or substituted phenyl, and $X=(S)_n$ where n=1 to 6. A particularly preferred compound of this structure is tetrabenzyl thiuram disulfide. The inventors of the present invention have found that the presence of aromatic substituents appears to confer greatly improved efficacy.

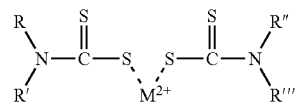

Where R, R', R" and R'" are either the same or are independently selected from C1-C10 alkyl (either straight or branched chain), benzyl, substituted benzyl, phenyl, or substituted phenyl and M is a divalent metal cation, preferably selected from the group consisting of nickel, copper and zinc.

Suitable dithiocarbamates include, for example, zinc dimethyl-dithiocarbamate (ZDMC), zinc diethyldithiocarbamate (ZDEC), zinc dibutyldithiocarbamate (ZDBC), zinc ethylphenyldithiocarbamate (ZEPC), zinc dibenzyldithiocarbamate (ZBEC), zinc pentamethylenedithiocarbamate (Z5MC), nickel dibutyl dithiocarbamate, nickel dimethyldithiocarbamate, and zinc diisononyldithiocarbamate. One particularly preferred compound of this structure is nickel dibutyldithiocarbamate, in which R, R', R" and R'" are all butyl groups and M is nickel.

The inventors of the present invention have found that when the compounds described above are incorporated into plastisols and used in coating an electroplating rack that the modified plastisol coating is very effective in preventing nucleation of electroless nickel deposits following etching and activation in the processing of plastic components. In addition, these compounds have a very low solubility in the processing solutions, including the solvent conditioners that are often used to increase the effectiveness of the etching stage.

Thus, in one embodiment, the present invention relates generally to a method of coating an electroplating rack used for supporting non-conductive substrates during a plating process, the method comprising the steps of:
 a) contacting at least a portion of the electroplating rack with a plastisol composition, the plastisol composition having dispersed therein an effective amount of an additive having the structure:

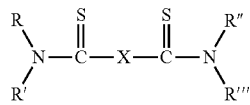

wherein R, R', R" and R'" are either the same or are independently selected from the group consisting of benzyl, substituted benzyl, phenyl or substituted phenyl, and $X=(S)_n$ where n=1 to 6; or

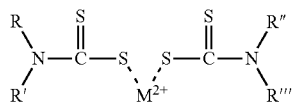

wherein R, R', R" and R'" are either the same or are independently selected from C1-C10 alkyl (either straight or branched chain), benzyl, substituted benzyl, phenyl, or substituted phenyl and M is a divalent metal cation, preferably selected from the group consisting of nickel, copper and zinc; and
 b) curing the plastisol composition on the electroplating rack.

If desired, the electroplating rack may be roughened to provide better adhesion of the applied plastisol coating. Thereafter, the electroplating rack is preferably preheated prior to application of the plastisol coating and the plastisol coating is thus applied to the preheated electroplating rack. The temperature to which the plating rack is preheated will depend on the type of plastisol used, but is preferably in the range of between about 300 and about 500° F., more preferably about 350 to about 450° F.

In a preferred embodiment, the plastisol coating is applied by dip-coating the electroplating rack in a bath of the plastisol. The plastisol coating thickness is typically in the range of about 25 mils to about 100 mils or more.

In order to obtain sufficient coating thickness and so that the coating is free of pits and voids, the electroplating rack may be dipped multiple times into the bath of the plastisol. Between each dipping operation (if multiple dipping steps are used), the plastisol coated electroplating racks are preferably cured in an oven for a short period of time, for example for between about 1 and about 10 minutes, more preferably, between about 3 and about 6 minutes. After a plastisol coating having the desired thickness is obtained, the coating is cured at a temperature of between about 300 and about 400° F., more preferably about 325 to about 375° F. for at least 30 minutes and as long as 3-4 hours depending on the thickness of the coating and the oven efficiency to firmly bake (or cure) the plastisol and form the solid insulating coating.

The present invention also relates generally to a method of metallizing non-conductive substrates, the method comprising the steps of:
 1) Preparing a plastisol coated electroplating rack as described above;
 2) Mounting the parts to be metallized on the rack;
 3) Etching the plastic components mounted on the treated racks in etching solutions that do not contain chromic acid (including, for example, etching solutions based on permanganate or manganese (III);
 4) Activating the surface of the plastic by immersing the plating racks in a solution comprising palladium;
 5) Immersing the rack in an accelerating process to remove protective tin oxides from the surface (in the case of colloidal palladium/tin activation) or immersing the rack in a reducing process to form palladium metal on the surface (in the case of ionic palladium);
 6) Immersing the racks containing the etched and activated parts in a metallization bath to chemically deposit either nickel or copper onto the surface of the activated part; and
 7) Electroplating the parts, typically by plating copper, nickel and/or chromium.

The invention will now be illustrated with reference to the following non-limiting examples:

Comparative Example 1

A plating rack test piece coated in a PVC plastisol coating (Ohmax, which is a trademark of MacDermid, Inc.) and an ABS test panel were subjected to the following process sequence:
 1) Immersion in an alkaline cleaner (ND7, which is a product of MacDermid, Inc.) at a temperature of 50° C. for 2 minutes, followed by rinsing in water;
 2) Immersion in a solvent mixture comprising propylene carbonate (10%) and butyrolactone (5%) at a temperature of 35° C. for 3 minutes, followed by rinsing in water;
 3) Immersion in a solution of 40% by weight sulfuric acid for 1 minute;
 4) Immersion in a plastic etching solution containing Manganese(III) ions and sulfuric acid according to the teachings set forth in U.S. Pat. Pub. No. 2013/186774 to Pearson et. al., the subject matter of which is herein incorporated by reference in its entirety, at a temperature of 65° C. for 10 minutes;
 5) Rinsing in water;
 6) Neutralizing in an acid solution containing ascorbic acid;

7) Rinsing in water;
8) Immersion in a solution consisting of 30% by weight of hydrochloric acid at ambient temperature for 1 minute;
9) Immersion in an activation solution comprising a palladium colloid (Mactivate D34c, available from MacDermid, Inc.) at a temperature of 30° C. for 3 minutes, followed by a water rinse;
10) Immersion in an accelerator (Ultracel 9369, available from MacDermid, Inc.) at a temperature of 50° C. for 2 minutes followed by a water rinse;
11) Immersion in an electroless nickel plating solution (Macuplex J64, available from MacDermid, Inc.) at a temperature of 30° C. for a time of 7 minutes followed by a water rinse;
12) Drying the rack for examination.

Following this treatment, the test pieces were examined and it was found that approximately 95% of the rack coating was covered in nickel. The nickel deposit was then removed from the rack using 50% by volume nitric acid solution and steps 1-12 were repeated multiple times using a fresh ABS panel for each cycle. The test always resulted in a coverage of more than 85% of the rack coating and complete coverage of the ABS panel.

Comparative Example 2

A plastisol coating was prepared by incorporating 5% by weight of tetramethyl thiuram monosulfide into Ohmax plastisol using a vacuum mixer to avoid the inclusion of air bubbles in the plastisol. This modified plastisol is encompassed under the teachings of JP 58-104-197. The plastisol was used to coat a plating rack test piece which was then subjected to the same processing sequence as used in Comparative Example 1.

In this case, there was no evidence of nickel plating on the plating rack and the ABS panel processed at the same time showed complete nickel coverage. The process sequence was repeated five times using a fresh ABS panel for each cycle. After three cycles, the ABS test panel began to show incomplete nickel coverage and after five cycles, the ABS test panel showed minimal nickel coverage due to the contamination of the process tanks with the tetramethylthiuram monosulfide.

Example 1

A plastisol coating was prepared by incorporating 15% by weight of nickel dibutyldithiocarbamate into Ohmax plastisol using a vacuum mixer to avoid inclusion of air bubbles in the plastisol. This modified plastisol was used to coating a plating rack which was then subjected to the same processing sequence as used in Comparative Example 1. In this case, there was no evidence of nickel plating on the plating rack.

The process sequence was repeated for 30 times with the same result. For each cycle, an ABS panel was processed at the same time and this panel showed complete coverage in nickel plating on every cycle.

Example 2

A plastisol coating was prepared by incorporating 5% by weight of tetrabenzyl thiuram disulfide into Ohmax plastisol using a vacuum mixer to avoid the inclusion of air bubble in the plastisol. This modified plastisol was used to coat a plating rack which was then subjected to the same processing sequence as used in Comparative Example 1. In this case, there was no evidence of nickel plating on the plating rack.

The process sequence was repeated for 30 times with the same result. For each cycle, an ABS panel was processed at the same time and this panel showed complete coverage in nickel plating on every cycle.

The invention claimed is:

1. A method of metallizing non-conductive substrates, the method comprising the steps of:
   a) mounting a non-conductive substrate to be metallized on one or more electroplating racks, wherein the one or more electroplating racks are coated with a plastisol composition to form a solid insulating coating on at least a portion of the one or more electroplating racks, the plastisol composition having dispersed therein an effective amount of an additive having the structure:

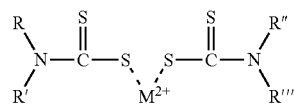

wherein R, R', R" and R'" are either the same or are independently selected from C1-C10 alkyl, benzyl, substituted benzyl, phenyl, or substituted phenyl and M is a divalent metal cation, selected from the group consisting of nickel, copper and zinc;
   b) etching the non-conductive substrate mounted on the one or more electroplating racks with an etchant that does not contain chromic acid;
   c) activating the surface of the non-conductive substrate by immersing the one or more electroplating racks with the non-conductive substrate mounted thereon into a solution comprising palladium;
   d) immersing the one or more electroplating racks containing the non-conductive substrate mounted thereon in an electroless metallization bath to electrolessly deposit metal thereon; and
   e) electroplating the non-conductive substrate to plate metal thereon,
   wherein the one or more electroplating racks coated with the plastisol composition remain free of the electrolessly deposited metal.

2. The method according to claim 1, wherein the plastisol composition is a PVC plastisol.

3. The method according to claim 1, wherein the additive is selected from the group consisting of zinc dimethyldithiocarbamate, zinc diethyldithiocarbamate, zinc dibutyldithiocarbamate, zinc ethylphenyldithiocarbamate, zinc dibenzyldithiocarbamate, zinc pentamethylenedithiocarbamate, nickel dibutyl dithiocarbamate, nickel dimethyldithiocarbamate, zinc diisononyldithiocarbamate, and combinations of one or more of the foregoing.

4. The method according to claim 3, wherein the additive comprises nickel dimethyldithiocarbamate.

5. The method according to claim 1, wherein the additive is present in the plastisol composition at a concentration in the range of about 1% to about 20% by weight.

6. The method according to claim 5, wherein the additive is present in the plastisol composition at a concentration in the range of about 5% to about 15% by weight.

* * * * *